(12) United States Patent
Kuznetsov

(10) Patent No.: US 8,538,806 B2
(45) Date of Patent: Sep. 17, 2013

(54) SYSTEMS AND METHODS FOR ESTABLISHING TRANSACTIONS UTILIZING A DATA STORE OF BILLING INFORMATION

(75) Inventor: Vsevolod Kuznetsov, St. Petersburg (RU)

(73) Assignee: Rawllin International Inc., Tortola (VG)

( * ) Notice: Subject to any disclaimer, the term of this patent is extended or adjusted under 35 U.S.C. 154(b) by 0 days.

(21) Appl. No.: 13/277,713

(22) Filed: Oct. 20, 2011

(65) Prior Publication Data
US 2013/0103464 A1 Apr. 25, 2013

(51) Int. Cl.
G06Q 30/00 (2012.01)
G06Q 40/00 (2012.01)

(52) U.S. Cl.
USPC ............ 705/14.17; 705/14.1; 705/35; 705/39; 705/44

(58) Field of Classification Search
USPC .................................................. 705/67, 14.67
See application file for complete search history.

(56) References Cited

U.S. PATENT DOCUMENTS

| | | | | |
|---|---|---|---|---|
| 5,453,601 A | * | 9/1995 | Rosen | ............................ 705/65 |
| 2006/0206425 A1 | | 9/2006 | Sharma | |
| 2008/0046349 A1 | | 2/2008 | Elberg | |
| 2008/0301041 A1 | | 12/2008 | Bruk | |
| 2009/0057396 A1 | | 3/2009 | Barbour | |
| 2009/0150294 A1 | * | 6/2009 | March et al. | ..................... 705/67 |
| 2011/0208814 A1 | | 8/2011 | Bostrom et al. | |

FOREIGN PATENT DOCUMENTS

| | | |
|---|---|---|
| EP | 2246815 A1 | 3/2010 |
| WO | 0161662 A2 | 8/2001 |

OTHER PUBLICATIONS

"Taleris Credit Union MasterMoneyTM/ATM Card Application", Taleris Credit Union, Nov. 2009, found on line at www.taleriscu.org/documents/MD0-022-DebitatmApp.pdf.*
OA dated Sep. 13, 2012 for U.S. Appl. No. 13/226182, 11 pages.
Final OA dated Apr. 16, 2013 for US Appl. No. 13/226,182, 7 pages.

* cited by examiner

Primary Examiner — John G Weiss
Assistant Examiner — Scott C Anderson
(74) Attorney, Agent, or Firm — Turocy & Watson, LLP

(57) ABSTRACT

Described herein are systems, methods and articles of manufacture that facilitate establishment of transactions via a data store, such as a data store, located in a network environment, such as a cloud computing environment. The data store can store information about an entity, including information about one or more bank accounts and associated identifying information, and a third party can search the data store to find the entity. The entity can implement various access controls to restrict the amount of identifying information displayed as a result of the search. The third party can add the entity to a private data store based on access controls and verification procedures established by the entity. The third party can also establish transactions, such as electronic funds transfers, with the entity.

29 Claims, 13 Drawing Sheets

SYSTEMS AND METHODS FOR ESTABLISHING TRANSACTIONS UTILIZING A DATA STORE OF BILLING INFORMATION

TECHNICAL FIELD

This disclosure relates generally to systems, methods and articles of manufacture that can facilitate establishment of a transaction via a data store of billing information stored in a cloud computing environment.

BACKGROUND

Conventionally, banks can establish transactions, such as electronic funds transfers, between account holders and entities whose bank account information is stored in the bank's electronic offerings. The account holder can search the offerings for the entity and, if the entity is found within the offerings, an electronic funds transfer between the account holder and the entity can be established. In the event the entity is not found within the offerings, however, the account holder must enter banking information for the entity into the offerings. Such banking information is often confidential and unknown to the account holder. Accordingly, unless the entity's banking information is already stored in the electronic offerings, an electronic funds transfer cannot be established between the account holder and the entity.

The above-described deficiencies of conventional transactions are merely intended to provide an overview of some of problems of current technology, and are not intended to be exhaustive. Other problems with the state of the art and corresponding benefits of some of the various embodiments described herein may become further apparent upon review of the following detailed description.

SUMMARY

The following description and the annexed drawings set forth in detail certain illustrative aspects of some of the various embodiments of funds management services. These aspects are indicative, however, of but a few of the various ways in which the principles of the various embodiments can be employed. The various embodiments described herein are intended to include all such aspects and their equivalents. Other advantages and distinctive features of the various embodiments will become apparent from the following detailed description of the various embodiments when considered in conjunction with the drawings.

Described herein are systems, methods and articles of manufacture that can facilitate establishment of transactions, such as an electronic funds transfer, between an entity and a third party utilizing a data store of entities stored in a cloud computing environment. The systems, methods and articles of manufacture described herein can be implemented in connection with any type of device with a connection to a communications network (a wireless communications network, the Internet, or the like), such as a mobile handset, a computer, a handheld device, or the like.

According to an embodiment, described herein are one or more servers in a cloud computing environment that store a service that can facilitate the establishment of transactions between an entity and a third party. The service can include a data store component that can store billing account information and identifying information for a plurality of entities. The service can also include an interface component that can receive a query including a search parameter. Also included in the service can be a search component that can determine a subset of the plurality of entities that satisfy the query. The subset of the plurality of entities can be filtered according to a criterion by a filter component of the service. The service can also include a display component that can display a subset of identifying information associated with the entity according to a security policy set by the entity. The service can also include a verification component that can determine that the entity can be added to a private data store based on the security policy associated with the entity.

According to another embodiment, described herein is a method for establishing transactions between an entity and a third party. The method can include receiving a query comprising an identifying parameter from a device. Based on the query, a data store in a cloud computing environment can be searched. The data store can include public identification information for a plurality of entities associated with private account information for the plurality of entities. A subset of the plurality of entities can be found satisfying the identifying parameter of the query. The public identification information for the subset of entities satisfying the identifying parameter can be displayed, and associated incentives can be displayed with the identifying information for at least one of the subset of the entities satisfying the identifying parameter. The method can also include receiving a request to add an entity of the subset of entities to a personal data store associated with the device and verifying the request to add the entity to the data store associated with the device based on a security setting.

Additionally, according to a further embodiment, described herein is a system that can provide a service stored in a cloud computing environment. The system can include an account establishment component that can create an account associated with an entity in a data store. The account can include identification information, first bank account information related to a first bank account of a first type and second bank account information related to a second bank account of a second type. The system can also include an access control component that can establish a subset of the identification information visible upon a search of the data store. The account can also include a linkage component that can link the first bank account or the second bank account to a third party based on matching a type of the third party to the first type or the second type.

Further, according to another embodiment, described herein is a method for establishing an entry of billing information for an entity in a data store housed in a cloud computing environment. The method includes adding an account to the data store. The account can include banking information and identification information. Access control restrictions can be established for the account, including a first access control restriction that establishes a first subset of the identification information that is visible upon a search of the data store and a second access control restriction that establishes a second subset of the identification information that is visible upon verification. Rules can also be established regarding an establishment of a funds transfer between the account and a third party.

According to yet another embodiment, described herein are articles of manufacture, such as a computer readable storage medium or the like. The articles of manufacture can store the instructions that, when executed by a computing device, can facilitate establishment of a transactions between an entity and a third party utilizing a data store of entities stored in a cloud computing environment.

These and other embodiments are described in more detail below with reference to the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
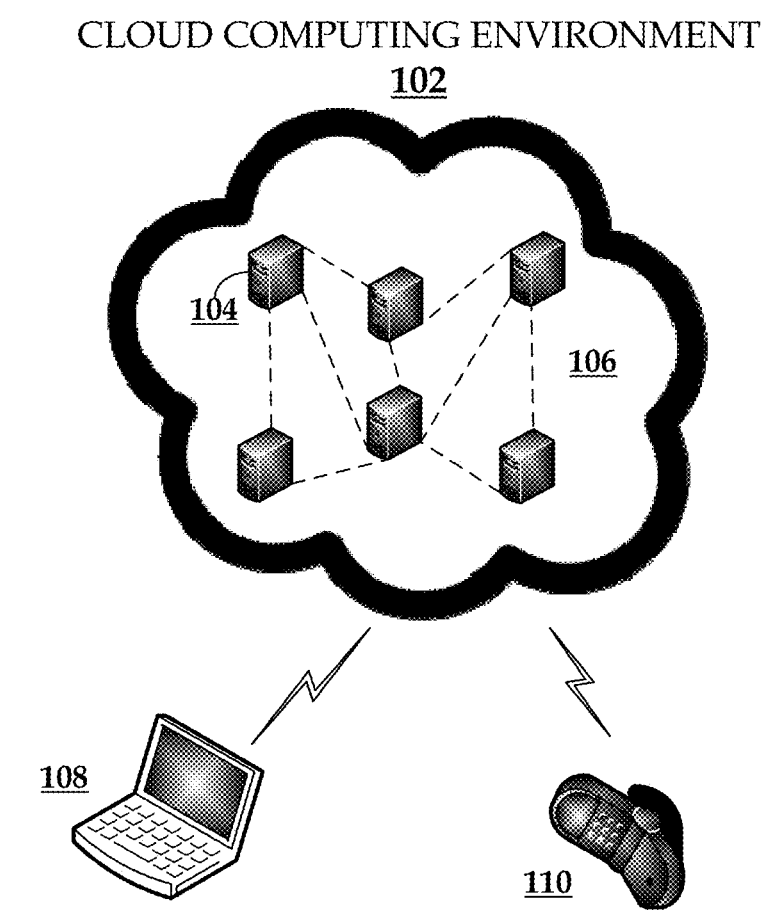
FIG. 1 illustrates a schematic system block diagram illustrating an example cloud computing system.

In the following description, numerous specific details are set forth to provide a thorough understanding of various embodiments. It will be understood that the service as described herein can be applied to transfer payments between various entities. The service which can, for example, be offered to a bank by a service provider can contain a database or data store of various entities. The bank, in turn, can use the service as an additional service to their core operations so that a third party customer of the bank can search the database for an entity (a legal entity or a private entity) to arrange an electronic payment to the entity.

Without this service, the entity would have to register with the service via the bank, via the service provider or another other institution that employs the service provider database and/or data store. The entity could add a name, any other IDs (email, username, phone number, or the like), an account ID for one or more bank accounts, set any one as default or identified each for various transactions and set any, none or all of these identifications to public or hidden. Then bank customer would have searched for the entity by the attributes set as public and added the entity as payee. Regardless of whether the entity set bank account information as public or hidden, the bank customer could see the list of account names as defined by the entity and select any one to transfer money to. Thus, although the third party (bank customer) could not see the account details, the third party would know to which account to deposit money. This service facilitates the electronic transfer of funds, eliminates the need for the third party to know which account to deposit money, and provides other advantages that will become apparent in view of the following discussion.

One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview of the various embodiments presented herein, to correct for the above identified deficiencies and other drawbacks of online funds management services, various systems, methods and articles of manufacture described herein to facilitate funds management.

Referring now to FIG. 1, illustrated is a schematic system block diagram of an example cloud computing system 100. The cloud computing system 100 can include a cloud computing environment 102 that can enable convenient, on-demand network access to a shared pool of configurable computing resources, such a server 104 or a network of servers 106 to various computing devices, such as a computer 108 or a mobile device 110. The electronic devices can access services, which can be stored on the server 104 or the network of servers 106, via a public network, such as the Internet, or a private network, eliminating the need for the services to be stored locally on the various computing devices.

Figure 2:
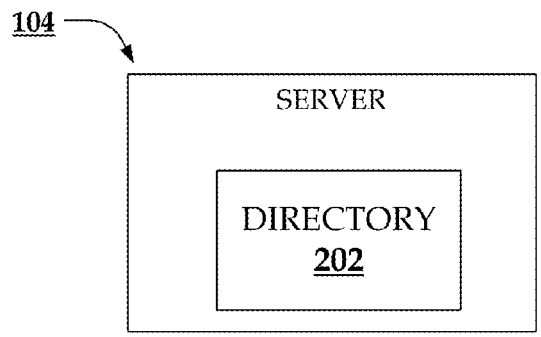
FIG. 2 illustrates a schematic system block diagram illustrating an example server in a cloud computing environment.
Figure 3:
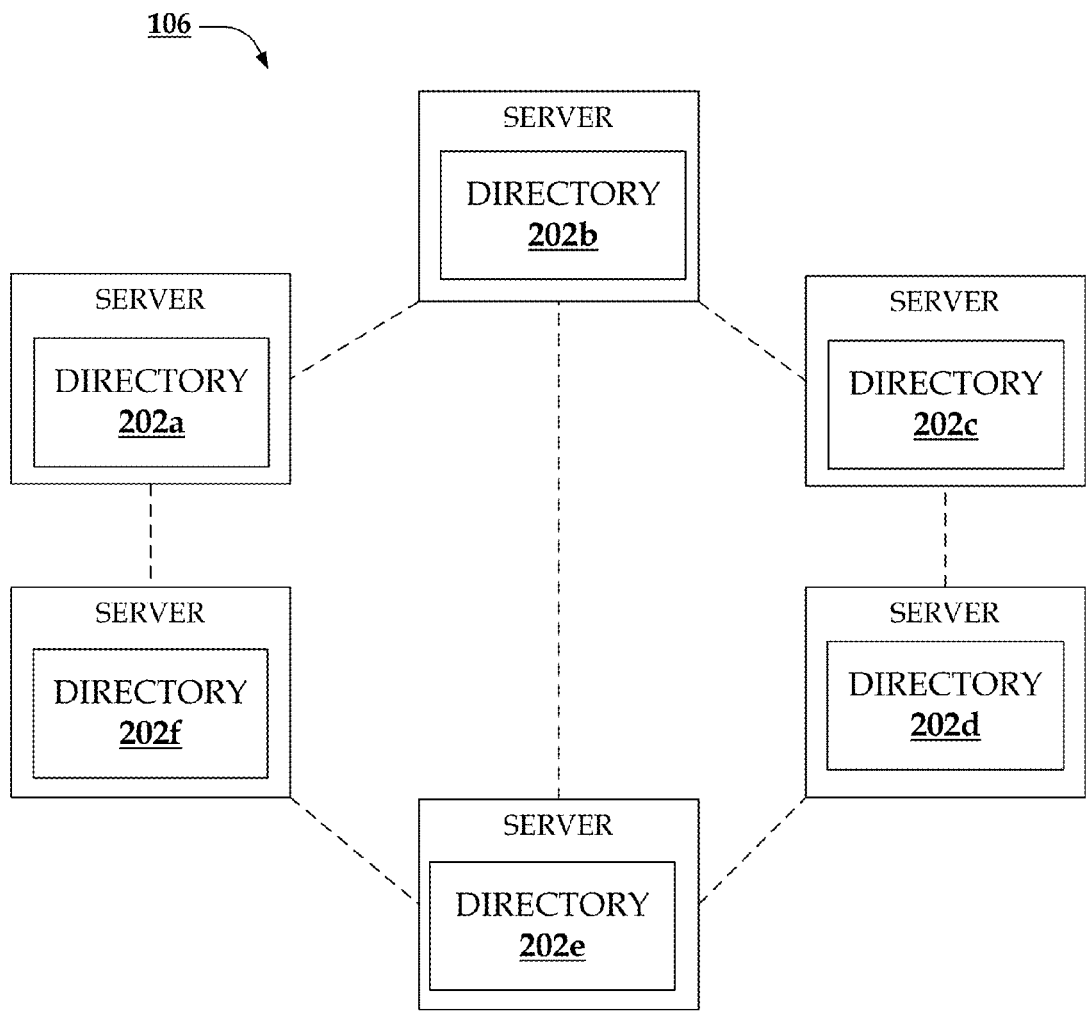
FIG. 3 illustrates a schematic system block diagram illustrating an example network of servers in a cloud computing environment.

FIG. 2 is an illustration of the server 104 that can store a service within the cloud computing environment 102. The service can be a data store 202 of billing information for various entities that can facilitate the establishment of transactions with entities, even if the entities are not included within a specific bank's offerings. FIG. 3 is an illustration of the network 106 that can store the same service. In this case, the data store 202 a-f of billing information can be distributed across various servers within the network 106 in the cloud computing environment 102. The data store 202 a-b can facilitate the establishment of transactions with entities, even if the entities are not included within a specific bank's offerings.

Figure 4:
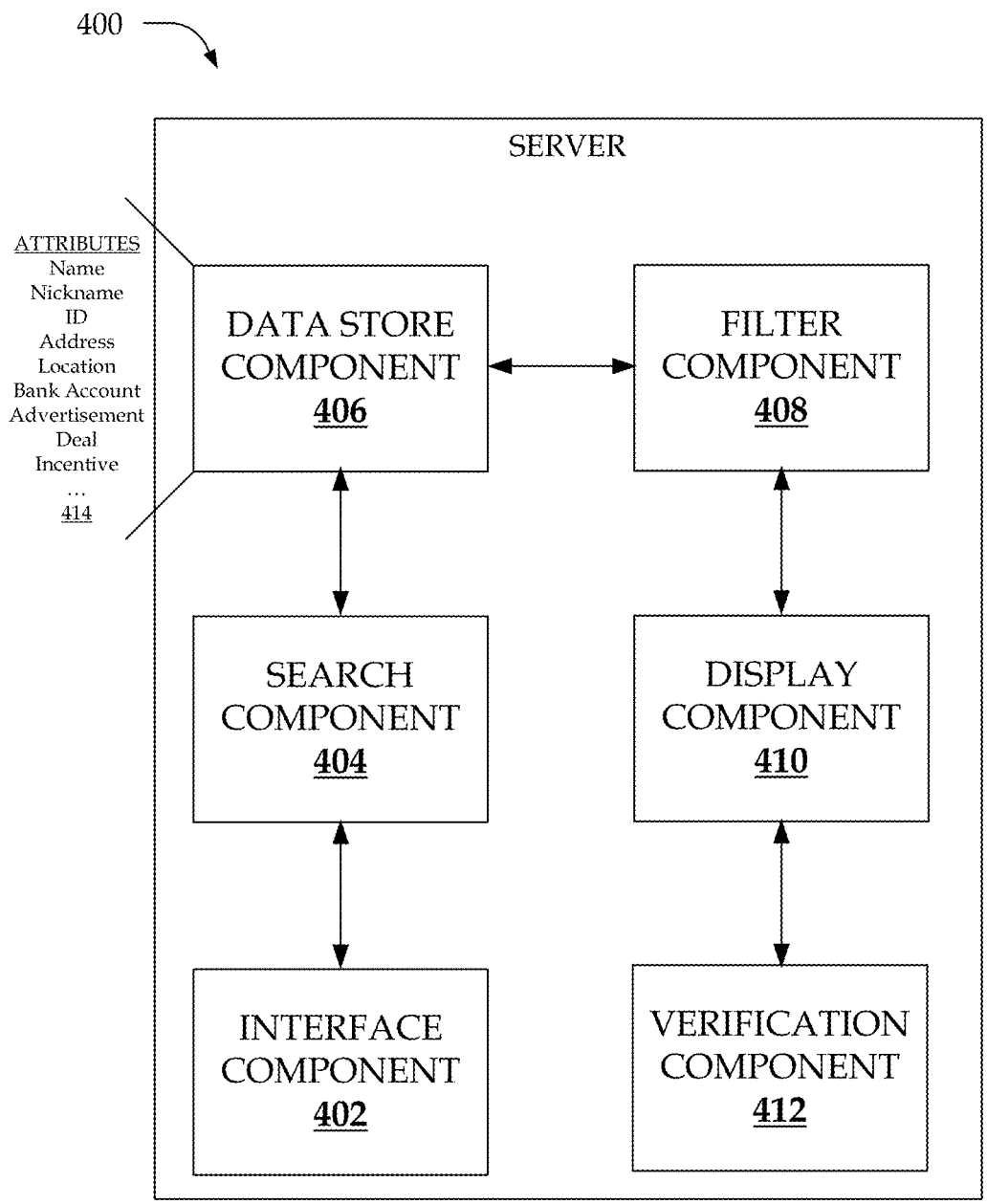
FIG. 4 illustrates a schematic system block diagram of a server in a cloud computing system that includes a service that facilitates searching for an entity in a data store.
Figure 5:
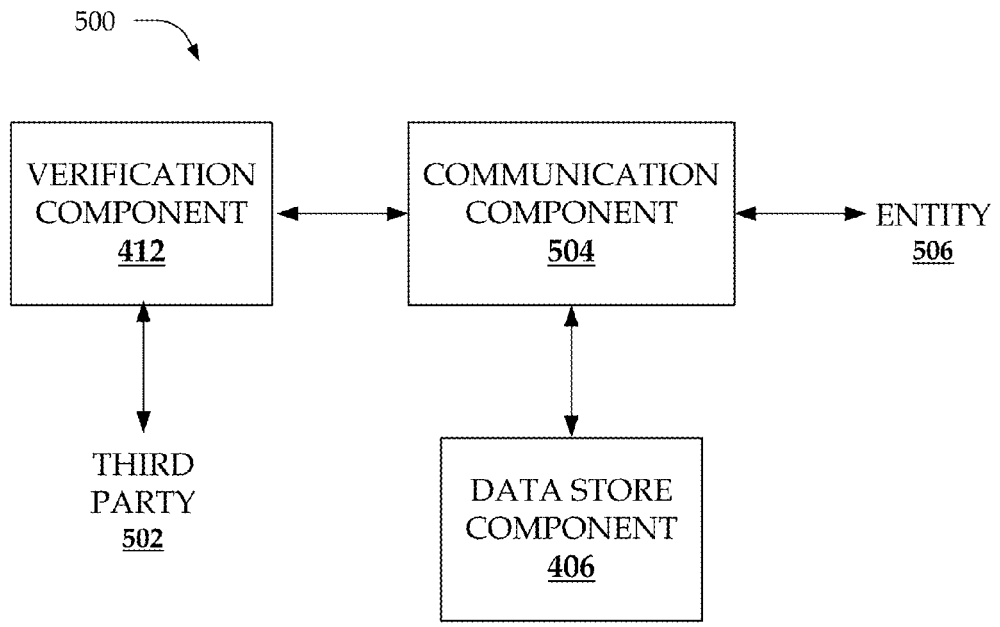
FIG. 5 illustrates a schematic system block diagram of a security system that can be part of the service that facilitates searching for the entity in the data store.
Figure 6:
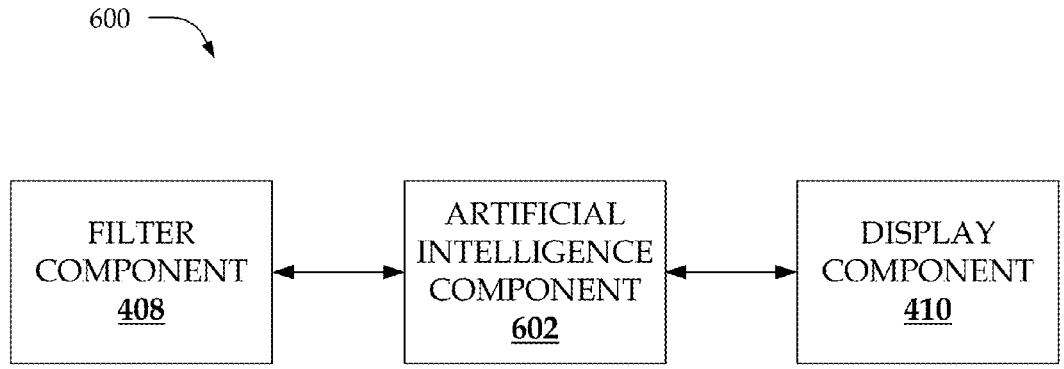
FIG. 6 illustrates a schematic system block diagram of an intelligent search system that can be part of the service that facilitates searching for the entity in the data store.

Although FIGS. 4-6 are illustrated as a single server, like server 104 illustrated in FIG. 2, this is merely for simplicity of explanation and illustration. It will be understood that the servers of FIGS. 4-6 can be distributed among various servers in a network, similarly to the illustration of the network 106 of FIG. 3. Additionally, not all of the components need to be stored on one or more servers; one or more of the components can be stored on any computing device that can be adapted for cloud computing purposes.

Referring now to FIG. 4, illustrated is a schematic system block diagram of a server 400 in a cloud computing system that can include a service that facilitates establishment of a transaction via a data store of billing information stored in a cloud computing environment. The service can include various components that can facilitate the establishment of a transaction between an entity and a third party.

The service can include an interface component 402 that can receive a query from a third party. The query can include a search parameter that can include information identifying an entity, a keyword describing the entity, or the like. The search parameter can be a name, a location, a keyword, a category, or any other identifying parameter. For example, a person can access the service through the interface component through his mobile phone. and pose a query for a taxi company in Los Angeles, Calif. The search term can be taxi company and/or Los Angeles, Calif. The service need not be accessed by a mobile phone; the service can, instead be accessed by any device that can access either an online search means, such as a weblink, a widget, a web page, or the like, or an offline search means, such as a QR or other barcode, other shortlink means, or the like.

The service can also include a search component 404 that can search a data store component 406 that stores information for a plurality of entities for a subset of the plurality of entities that satisfy the query. The data store component 406 can store billing account information and corresponding identification information for a plurality of entities, both private entities and legal entities.

The data store component 406 can include a collection of a plurality of attributes 414, including name, nickname, id, address, location, bank account information, and the like. The attributes 414 can include required values and optional values. The required values and the optional values can be entered by the entity owner for each entity during a registration process. Depending on the privacy setting provided during registration, any number of attributes 414 can be set as hidden or public. If an attribute is set to public, its value can be searched by a third party. Attribute values can also include references to advertisements, deals, incentives, and the like, that can be linked to the account for the entity. The attributes can also include a personal photograph, a logo, or any feature that eases identification of the entity. The service provider can validate the identity associated with the bank account information, and this can be an additional attribute.

The data store component 406 can include only certain attributes, like IDs, for example, and refer to a separate component (not shown) that can house the additional attributes. Any reference to "information," "data," or the like as referred to herein shall be understood to refer to attributes and accompanying values.

The data store component 406 can store an account for a private entity named Joe Smith. The identifying information can be a name (Joe Smith), a nickname (jsmith504021), an address (123 Main Street, Los Angeles, Calif. 90210), an e-mail address (jsmith50421@emailserver.com), identifying keywords, or the like. The identifying information can be associated with one or more billing accounts. For example, Joe Smith can have a credit card associated with the account for making payments and a checking account associated with the account for receiving payments. Accordingly, the credit card can be associated with a payment type and the checking account can be associated with a receiving type.

The data store component 406 can also store an account for a legal entity like Joe's Taxi Company. The identifying information can be a name (Joe's Taxi Company), a nickname (JoeTaxi1), an address (456 Apple Street, Los Angeles, Calif. 90210), an e-mail address (sales@joestaxi.com), identifying keywords, or the like. The identifying information can be associated with one or more billing accounts. The identifying information can also be associated with various advertisements, incentives, deals or rewards. For example, Joe's Taxi can have a bank account associated with payments for bills related to the operation of the Taxi company, such as gasoline bills for the taxis, which can be associated with an expenses type. Joe's Taxi can also have a second bank account associated with employee payroll, which can be associated with a payroll type. Joe's Taxi can also have a third bank account associated with receiving payments from customers for transport services and a fourth bank account associated with receiving payments from customers for vehicle maintenance. The third account can be associated with a receiving type and a transport type, while the fourth account can be associated with the receiving type and a maintenance type.

The accounts in the data store can also be associated with privacy settings. The bank account information is kept private by default so that it is not displayed to anyone except the entity is the account holder. However, an option can exist to display the account information to certain third parties. For example, the bank account information of a legal entity could be made public to a third party for contractual or reference purposes.

A privacy policy can be set for the identifying information. The privacy policy can depend on the third party making the search and/or authorization from Joe Smith. For example, Joe Smith may not want a bill collector associated with a disputed credit card charge to know that he has an account in the data store. Accordingly, Joe Smith can set a privacy setting so that, unless he authorizes the user making the search to know he has an account, his identifying information is not displayed as a search result. An entity whose information includes a bank account can receive payments without displaying the bank account information to the third party searcher. It can be left up to the financial institution to transfer money to the bank account of the entity without revealing the information to the third party.

In other situations, Joe Smith can set an option so that only his nickname is displayed in a search result. Or Joe Smith can set an option so that any portion of his identifying information is displayed as a search result, depending on the person making the search. For example, a third party can search for Joe Smith according to a search with a number of default attributes. These default attributes can include name, location and e-mail. Joe Smith can make any one of these attributes searchable by any type of third party through the privacy policy. The third party can also utilize an advanced search which can display additional fields for a search, such as nickname, telephone, or the like. Joe Smith can also set any one of these attributes as searchable to any type of third party through the privacy policy.

Similarly, Joe's Taxi Company can also set a privacy policy. In this case, Joe's Taxi Company wants to appear to as many consumers as possible. The data store can have a premium payment option, similar to the Yellow Pages phone data store, where his identifying information is associated with an advertisement, such as a graphic, a larger text size than the default, being associated with additional keywords, of the like. Alternatively, Joe's Taxi Company can have a list of "problem" consumers that do not pay or harass drivers; the privacy policy can prevent third parties on this list from finding Joe's Taxis Company in a search.

The search component 404 can search the data store according to the query with the search parameter. For example, if a third party searches for a taxi company in Los Angeles, Calif., the search component 404 can parse the query for identifying information or keywords, including taxi company, Los Angeles, Calif. The search component 404 can also discern information about the third party, such as a location, based on information sent with the query. The location can be determined from a GPS location of the mobile device that can be sent with the query through the interface component 402.

The search component 404 can produce a subset of the plurality of entities in the data store that satisfy the search parameters. For example, when searching for a taxi company in Los Angeles, Calif., the search component 404 can search the data store component 406 and find one hundred results. These results can be narrowed to a more manageable number by a filter component 408. Alternatively, for example, when searching for Joe Smith in Los Angeles, Calif., the search component search component 404 can search the data store component 406 and find also one hundred results.

The filter component 408 can filter the results from the search component 406 according to a criterion. The criterion can be a preset criterion, like proximity of location, or set by the user, like a certain price point or a telephone number. The filter component 408 can also apply a criterion related to a premium payment from the entity so that the entity can show up more often in searches. In the case of a search for a taxi company in Los Angeles, Calif., the filter component can employ a "location" criterion and isolate Joe's Taxi Company, Incredible Taxi, and Green Cab Company based on the criterion. The results isolated by the filter component 408 can be displayed (e.g., on a screen associated with the device making the query) by a display component 410 with consideration of the security policy. For example, Icy Blue Taxi also can satisfy the results, but the security policy can restrict it from appearing in the results. For example, if the third party is in a location restricted by the security policy associated with Icy Blue Taxi company, Icy Blue Taxi company would not show up as a result. The criterion can also be based on unique attributes of the entity, such as women or minority ownership, green technologies, handicapped friendly, or any other criterion satisfying an interest graph.

The results can be displayed with premium associated features. For example, Joe's Taxi Company can be associated with an coupon incentive, like $5 off a 10 mile taxi ride, Incredible Taxi can be associated with an advertisement and/or a graphic, and Green Cab Company can be associated with a coupon incentive, like $3 off a 5 mile ride. The third party can select a taxi company based on the results.

The service can also include a verification component 412 that can contact the entity if the third party requests additional information about the entity, if the security policy requires verification, if the third party requests that the entity be added to a private address book, such as an address book associated with the device making the request.

Based on the selection and/or the verification, the service can establish an electronic payment from the third party to the entity. For example, if the third party selects Joe's Taxi Company, the service can establish an electronic payment, accounting for the incentive, between the third party and Joe's Taxi Company. Since Joe's Taxi Company has several bank accounts listed in the data store, the third party can have a type that can be matched to an account type and the payment established with the account of the type. For example, the third party can be making a payment of a transportation type, and the payment can be established with the third bank account of the transportation type.

The service can include additional components that can intelligently establish the payment to the correct account. The service can include an analysis component (not illustrated) that can determine the type of third party. This determination can utilize parameters found in the initial query, such as a location of the device or the type of query. The service can also include an associated component (not illustrated) that can associate billing information associated with the third party with a payment account associated with the chosen entity, based on the determination and a type of the payment account associated with the chosen entity. Although not illustrated, the service can also include additional components that facilitate wiring money to the entity from the third party so that the money should arrive to the recipient within a short time period (e.g., several seconds or minutes). For example, the service can include tools that can establish relationships between banks to establish near instant transfers of funds.

Referring now to FIG. 5, illustrated is a schematic system block diagram of a security system 500 that can be part of the service that facilitates searching for the entity in the data store as described with regard to FIG. 4. The security system 500 can receive a request from a third party 502 to add an entity 506 to a local data store, such as a data store associated with the device initiating the request or a private data store in a cloud computing environment. The information added to the private data store does not include the bank account information, but does include enough information to establish a transaction, such as an electronic funds transfer.

The request can invoke the verification component 412 as described above to request a confirmation from the entity 506 that the entity will allow the third party 502 to add the entity 506 to a private data store associated with the third party 506. Based on the security policy, the verification component 412 can deny the request outright or request verification from the entity 506, for example, regarding the amount of information that can be added to the private data store associated with the third party 502.

The service can include a communication component 504 that can consult the data store component 406 for information related to the entity. Additionally or alternatively, the communication component can consult the security policy or the data store component 506 for a preferred contact method. The communication component 504 can create a communication, such as an e-mail message, to the entity 506 requesting that the third party 502 add the entity 506 to a personal data store and/or confirming the amount of identification information that can be added to the personal data store of the third party 502. For example, if the entity 506 is a seller on an e-commerce site, he might not want his entire name stored in a data store of a third party 502. Instead, he might only authorize a nickname to be stored in the personal data store of the third party 502.

Referring now to FIG. 6, illustrated is a schematic system block diagram of an intelligent search system 600 that can be part of the service that facilitates searching for the entity in the data store as described with regard to FIG. 4. The system 600 can include an artificial intelligence component 602 that can facilitate certain functions of the filter component 408 narrowing the results of the search component so that a smaller number is displayed to a third party by the display component 410.

The filter component 408 can employ the artificial intelligence component 602 to facilitate its filtering of the search results. The artificial intelligence component 602 can employ various artificial intelligence techniques (e.g., stored or historical data analysis, neural network, classifier, support vector machine, or the like) to facilitate the filtering.

The artificial intelligence component 602 can employ various artificial intelligence-based schemes or techniques for carrying out various functionalities. One type of artificial intelligence-based technique employs a classifier, a function that maps an input attribute vector, $x=(x1, x2, x3, x4, xn)$, to a confidence that the input belongs to a class, that is, $f(x)$ =confidence(class). Such classification can employ a probabilistic and/or statistical-based analysis (e.g., factoring into the analysis utilities and costs) to prognose or infer an action to be automatically performed (e.g., filtering by the filter component 408).

A support vector machine (SVM) is an example of a classifier that can be employed. The SVM can determine a hypersurface in the space of possible inputs that can attempt to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, probabilistic classification models providing different patterns of independence, and the like. Classification is also inclusive of statistical regression that is utilized to develop models of priority.

Classifiers can be explicitly trained (e.g., via a generic training data) or implicitly trained (e.g., via observing user behavior, receiving extrinsic information, like historical data). For example, SVMs can be configured via a learning or training phase within a classifier constructor and feature selection module. Thus, the classifiers can be utilized to automatically learn and perform a number of functions, such as filtering the search results according to an inference.

Figure 7:
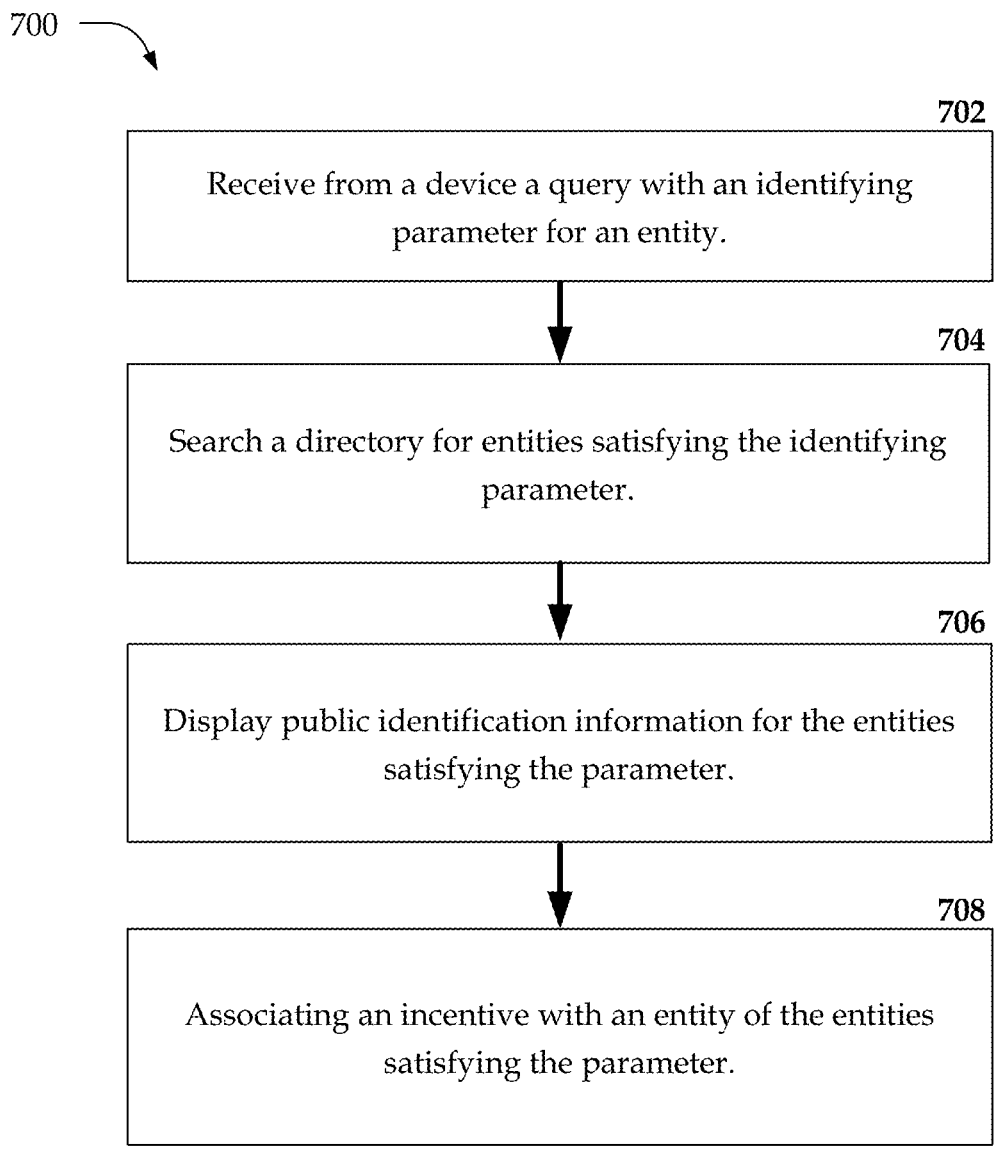
FIG. 7 illustrates a schematic process flow diagram of a method that can associate an incentive with an entity that satisfies a criterion of a search of a data store.
Figure 8:
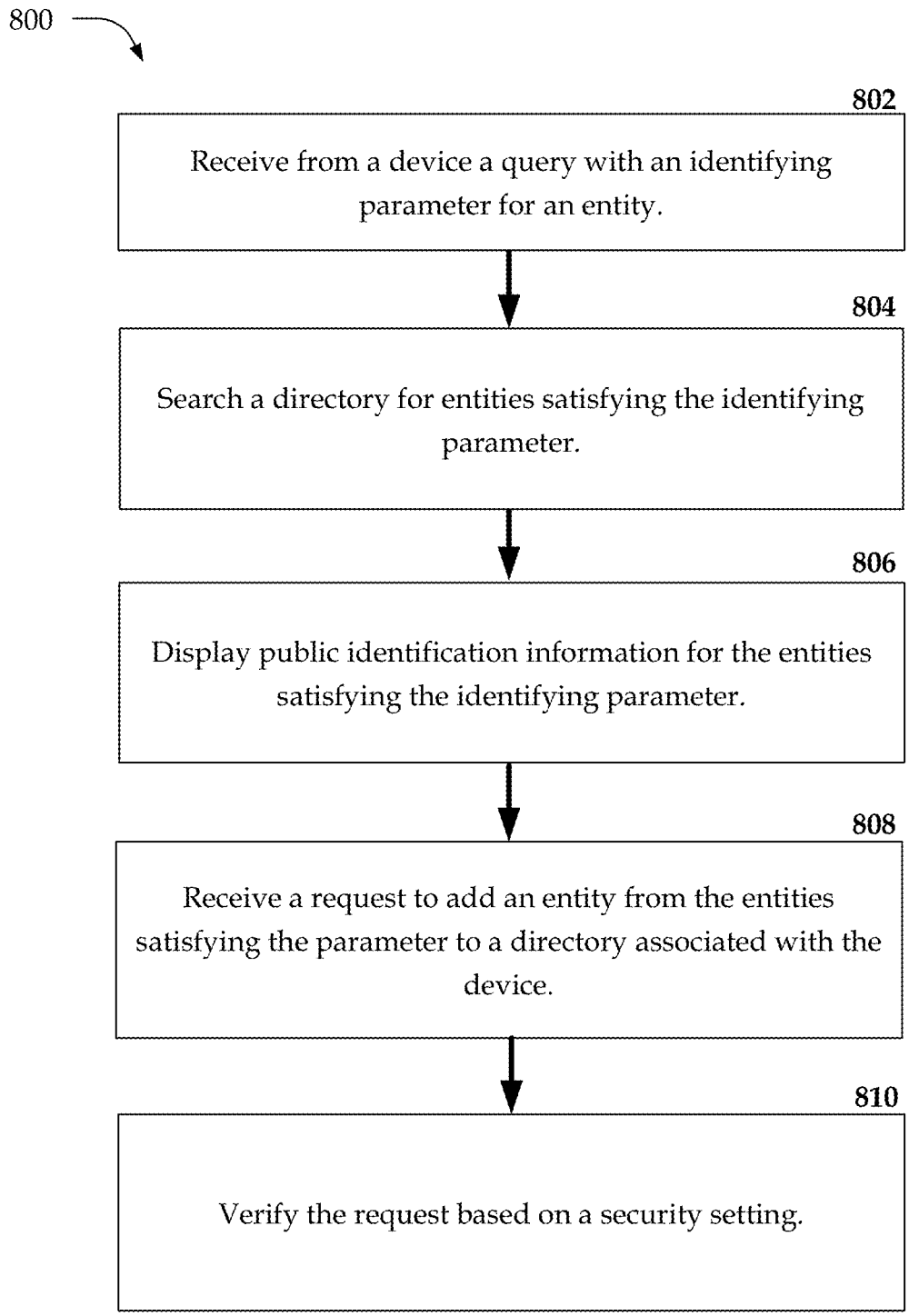
FIG. 8 illustrates a schematic process flow diagram of a method that establishes security associated with an entity that satisfies a search of a data store.
Figure 9:
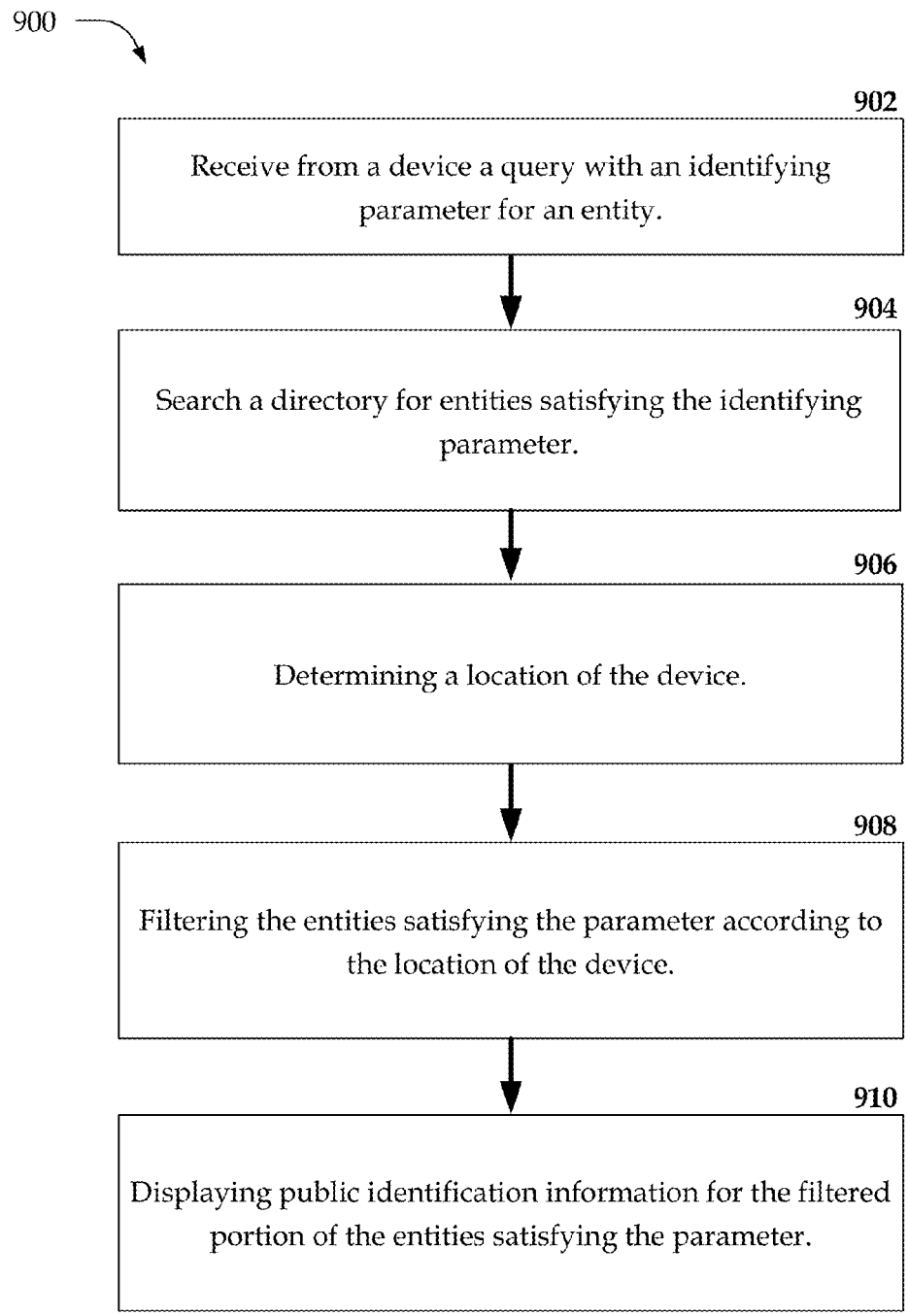
FIG. 9 illustrates a schematic process flow diagram of a method that facilitates the establishment of electronic transactions between an entity and a third party.

FIGS. 7-9 illustrate methods that facilitate establishment of transactions between an entity and a third party. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium. Any reference to a data store below can refer to a data store stored in a cloud computing environment. Additionally, all or part of the acts and/or steps described below can occur as a service in a cloud computing environment.

Referring now to FIG. 7, illustrated is a schematic process flow diagram of a method 700 that can associate an incentive with an entity that satisfies a criterion of a search of a data store as described with regard to FIG. 4. The method 700 can apply to searching a data store of entities, both legal and private, stored within a cloud computing environment.

The method 700 begins at element 702 upon receiving a query with an identifying parameter for an entity. The query can be received from a device, such as a mobile device, associated with a third party. The query can include a parameter related to an entity. The parameter can be a name, a location, a keyword, a category, or any other identifying parameter. For example, a person can pose a query for a taxi company in Los Angeles, Calif. The parameter can be an entity type parameter, such as taxi company, or a location parameter, such as Los Angeles, Calif.

At element 704, a data store can be searched for entities satisfying the parameter. The data store can store billing account information and corresponding identification information for a plurality of entities, both private entities and legal entities. For example, a private entity can be a person named Joe Smith, who utilizes his account in the data store to pay bills and to receive payments for sales on through an auction site. He can establish different bank accounts to correspond to different functionalities. He can also establish different security policies corresponding to the different functionalities (e.g., the identifying information displayed can include his entire name and address for paying bills, but only include a nickname for receiving payments for sales through the auction site). A legal entity can be a taxi company, such as Joe's Taxi Company. Similarly, the taxi company can have different accounts associated with different functionalities and privacy policies. For example, the taxi company can have an account for payments from customers on the east side of the city and another account for payments from customers on the west side of the city. Both the private entity and the legal entity can have privacy policies established for the various accounts, so that only public identification information can be displayed in a search of the data store.

The search of the data store can be based on the parameter (e.g., a keyword or identifying parameter). For example, if a third party searches for a taxi company in Los Angeles, Calif., a subset of the plurality of entities in the data store that satisfy the search parameters can be produced. At element 706, public information (set according to a security policy) can be displayed for each entity satisfying the parameter. At element 708, an incentive can be associated with an entity satisfying the parameter. For example, if Joe's Taxi Company, Incredible Taxi, and Green Cab Company satisfy the parameter, all three companies can be displayed. Joe's Taxi Company can be associated with an coupon incentive, like $5 off a 10 mile taxi ride, Incredible Taxi can be associated with an advertisement and/or a graphic, and Green Cab Company can be associated with a coupon incentive, like $3 off a 5 mile ride. The third party can select a taxi company based on the results. The incentive is designed to encourage the third party to select one taxi company over another. Based on the selection, a transaction, such as an electronic payment, can be established between the third party and the entity.

Referring now to FIG. 8, illustrated is a schematic process flow diagram of a method 800 that establishes security associated with an entity that satisfies a search of a data store. The method 800 can apply to searching a data store of entities, both legal and private, stored within a cloud computing environment.

Method 800 begins at element 802 with receiving from a device a query with an identifying parameter for an entity. At element 804, the data store can be searched for entities satisfying the identifying parameter. At element 806, public identification information can be displayed for entities satisfying the identifying parameter. The public identification information can be defined in a security policy for each entity.

At element 808, a request to add an entity from the entities satisfying the parameter to a personal data store (e.g., a personal data store associated with the device making the request or a personal data store in a cloud computing environment) can be received. At element 810, the request can be verified based on a security setting for the entity. The security setting can deny all requests to add the entity to a personal data store or can require verification of the request to add the entity to a personal data store. The security policy can also set an amount of information that can be added to the private data store.

For example, if the entity is Joe Smith regarding a transaction on an e-commerce site, he can verify that he does not authorize his entire contact information stored in a personal data store of a third party. Instead, he can authorize only a nickname to be stored in the personal data store. Based on the verification, a transaction, such as an electronic funds transfer, can be established between the third party and the entity. By adding the entity to the personal data store, the third party can have a one-stop location for easily contacting the entity (e.g., according to a stored phone number) and for establishing a transaction, such as an electronic funds transfer for a service agreed to in a phone call, between the third party and the entity.

Referring now to FIG. 9, illustrated is a schematic process flow diagram of a method 900 that facilitates the establishment of electronic transactions between an entity and a third party. The method 900 can apply to searching a data store of entities, both legal and private, stored within a cloud computing environment.

At element 902, a query can be received from a device with an identifying parameter for an entity. At element 904, a data store can be searched for entities satisfying the identifying parameter. At element 906, a location of the device can be determined. This determination can be based on information included in the query, such as GPS data related to the device. The determination can also be based on artificial intelligence techniques. At element 910, the entities satisfying the parameter can be filtered according to the location of the device or any other additional criteria. The filtering can employ artificial intelligence techniques. The filtering can also be based on premium features that the entities of the data store can buy to show up as results of more queries. At element 910, the filtered portion of the entities satisfying the parameter can be displayed. Transactions can be established thereafter between the third party and a selected entity from the display.

Although FIGS. 10-13 are illustrated as a single server, like server 104 illustrated in FIG. 2, this is merely for simplicity of explanation and illustration. It will be understood that the servers of FIGS. 10-13 can be distributed among various servers in a network, similarly to the illustration of the network 106 of FIG. 3. Additionally, not all of the components need to be stored on one or more servers; one or more of the components can be stored on any computing device that can be adapted for cloud computing purposes.

Figure 10:
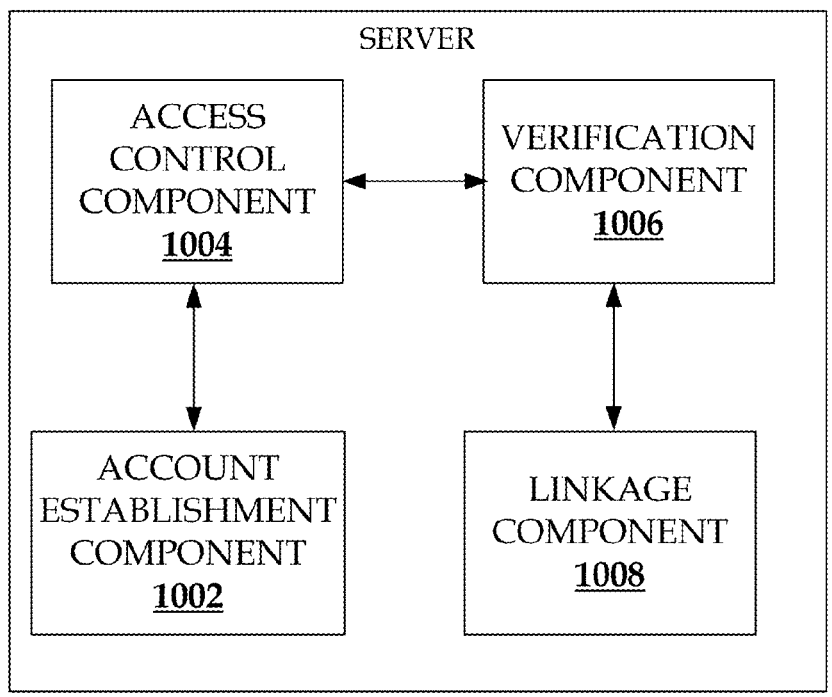
FIG. 10 illustrates a schematic system block diagram of a server in a cloud computing system that can include a service that can facilitate establishment of accounts in a data store.

Referring now to FIG. 10, illustrated is a schematic system block diagram of a server 1000 in a cloud computing system that can include a service that can facilitate establishment of accounts in a data store. The service can also include various components that can facilitate the establishment of a data store with entities and associated billing information that can facilitate establishment of a transaction between an entity and a third party.

The service can include an account establishment component 1002 that can create an account associated with an entity in a data store. The account can include identification information and information related to one or more bank accounts. The identification information can include a name, a nickname, an e-mail address, an address, directions to the address, keywords, advertisements, incentives, and the like. The account can include a first bank account information related to a first bank account of a first type and a second bank account information related to a second bank account of a second type.

The entity can be a private entity, such as Joe Smith, or a public entity, such as Joe's Taxi Company. The entity can have multiple accounts associated with multiple functionalities. In the case of a private entity, Joe Smith can utilize his account in the data store to pay bills and to receive payments for sales through an auction site. He can establish different bank accounts to correspond to the different functionalities. In the case of the legal entity, Joe's Taxi Company can have different accounts associated with different functionalities, such as an account for payments from customers on the east side of the city and another account for payments from customers on the west side of the city.

The service can also include an access control component 1004 that can establish privacy parameters for the entity. The bank accounts are always kept private and never displayed to any user other than the entity itself. The privacy parameters can restrict the amount of identifying information that is displayed to third parties searching for the entity. The privacy parameters can establish that the entity never shows up as a result of a search, that the entity shows up only as a result of certain searches conducted by certain third parties, or that the entity shows up as a result of every search that it satisfies. The privacy parameters can establish that only a nickname is returned as a result of a search for a business transaction, while the entire identifying information is returned in a search for a personal transaction. For example, Joe Smith can set a privacy policy so a nickname only shows up in a search result for establishing a payment for an online auction, but his entire contact information shows up in a search result for establishing a payment for his electric bill.

The service can also include a verification component 1006 that can receive a request from a third party to establish a linkage with the entity. The linkage can be adding the entity to a private data store or establishing a transaction between the entity and a third party. The access control component 1004 can establish conditions requiring verification by the entity before any linkage can occur involving the entity. The service can also include a linkage component 1008 that can link an account of the entity with an account of a third party. The linkage component 1008 can match a type of the third party with a type of an account. For example, with regard to Joe's Taxi Company, the linkage component 1008 can determine that the third party is on the east side of the city and match the third party with the account for payments from the east side of the city.

Figure 11:
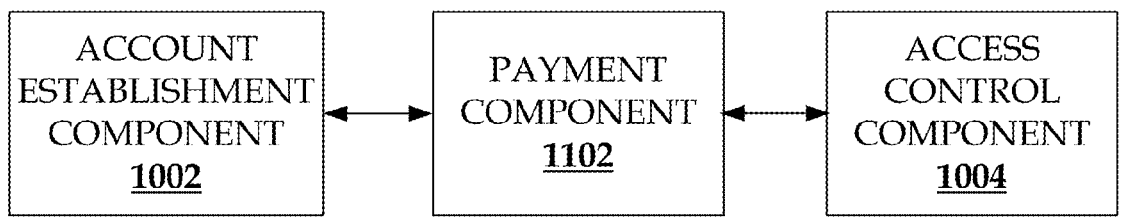
FIG. 11 illustrates a schematic system block diagram of a system that facilitates establishment of premium payments for premium account features related to the accounts in the data store of the service that can facilitate establishment of accounts in the data store.

Referring now to FIG. 11, illustrated is a schematic system block diagram of a system 1100 that facilitates establishment of premium payments for premium account features related to the accounts in the data store of the service that can facilitate establishment of accounts in the data store as described with regard to FIG. 10. The system 1100 can include a payment component 1102 that can receive a premium payment from the entity and associate a premium feature with the account created by the account establishment component 1002. Privacy settings can be established for these premium features by the access control component 1004.

The premium features can include associating a greater number of keywords with the entity than a standard number of keywords. For example, the standard number of keywords can be five keywords, and a premium feature can be 3 additional keywords. This can increase the likelihood that the entity will show up in a search based on keywords.

The premium features can also include a graphic or a large text size that can increase the visibility of the entity as a search result. According to an example, a standard text size for an entity showing up as a search result can be 10 point, but a premium text size can be 14 point bold. The results of the search can, additionally or alternatively, include a graphical representation of the name or a logo associated with the entity. These premium features can increase the likelihood that the entity will be chosen as a result of a search.

The system can also include a reward component (not illustrated) that can generate a reward (e.g., coupon, incentive, or the like) to encourage a third party to choose the entity as a result of a search. The reward can also be a premium feature where normally a certain number of rewards can be associated with the entity, but with a premium feature a greater number of rewards or a greater frequency of change can be associated with the entity.

Figure 12:
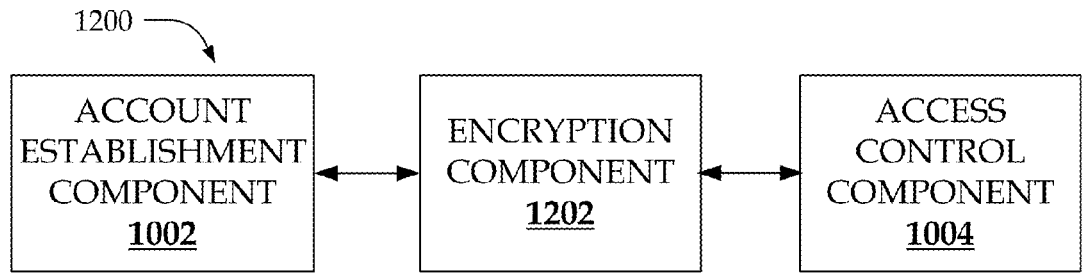
FIG. 12 illustrates a schematic system block diagram of an encryption system related to features of the accounts in the data store of the service that can facilitate establishment of accounts in a data store.

Referring now to FIG. 12, illustrated is a schematic system block diagram of an encryption system 1200 related to features of the accounts in the data store of the service. The system 1200 that can facilitate establishment of accounts in a data store as described with regard to FIG. 10.

System 1200 can include an encryption component that can encrypt the bank account information associated with the account created by the account establishment component 1200. This can ensure an additional step of access control in addition to the security policy put in place by the access control component 1004. The encryption component 1202 can not only encrypt the bank accounts, but also provide fake account numbers linked to real account numbers that can mask the real account numbers. This can provide an additional level of security, even though the bank account information is never shared with any user other than the entity.

Figure 13:
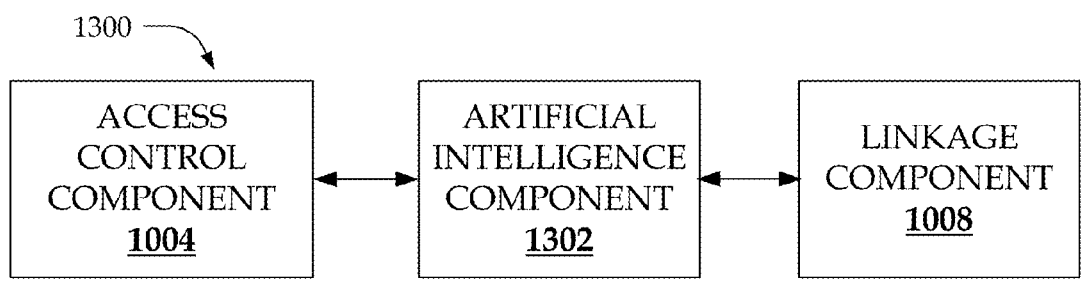
FIG. 13 illustrates a schematic system block diagram of a system that can facilitate linkages between an entity and a third party as part of the service that can facilitate establishment of accounts in a data store.

Referring now to FIG. 13, illustrated is a schematic system block diagram of a system 1300 that can facilitate linkages between an entity and a third party as part of the service that can facilitate establishment of accounts in a data store as described with regard to FIG. 10. The system 1300 can include an artificial intelligence component 1302 that can facilitate certain functions of the access control component 1004 by inferring an entity's response to a linkage request and establishing the linkage through the linkage component 1006.

The linkage component 1006 can employ the artificial intelligence component 1302 to facilitate its determination of whether to allow a linkage based on access control parameters established by the access control component 1004. The artificial intelligence component 1302 can employ various artificial intelligence techniques (e.g., stored or historical data analysis, neural network, classifier, support vector machine, or the like) to facilitate the determination.

The artificial intelligence component 1302 can employ various artificial intelligence-based schemes or techniques for carrying out various functionalities. One type of artificial intelligence-based technique employs a classifier, a function that maps an input attribute vector, x=(x1, x2, x3, x4, xn), to a confidence that the input belongs to a class, that is, f(x) =confidence(class). Such classification can employ a probabilistic and/or statistical-based analysis (e.g., factoring into the analysis utilities and costs) to prognose or infer an action to be automatically performed (e.g., determining whether to allow a linkage by the linkage component 1008).

A support vector machine (SVM) is an example of a classifier that can be employed. The SVM can determine a hyper-surface in the space of possible inputs that can attempt to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, probabilistic classification models providing different patterns of independence, and the like. Classification is also inclusive of statistical regression that is utilized to develop models of priority.

Classifiers can be explicitly trained (e.g., via a generic training data) or implicitly trained (e.g., via observing user behavior, receiving extrinsic information, like historical data). For example, SVMs can be configured via a learning or training phase within a classifier constructor and feature selection module. Thus, the classifiers can be utilized to automatically learn and perform a number of functions, such as establishing or prohibiting a linkage according to an inference.

Figure 14:
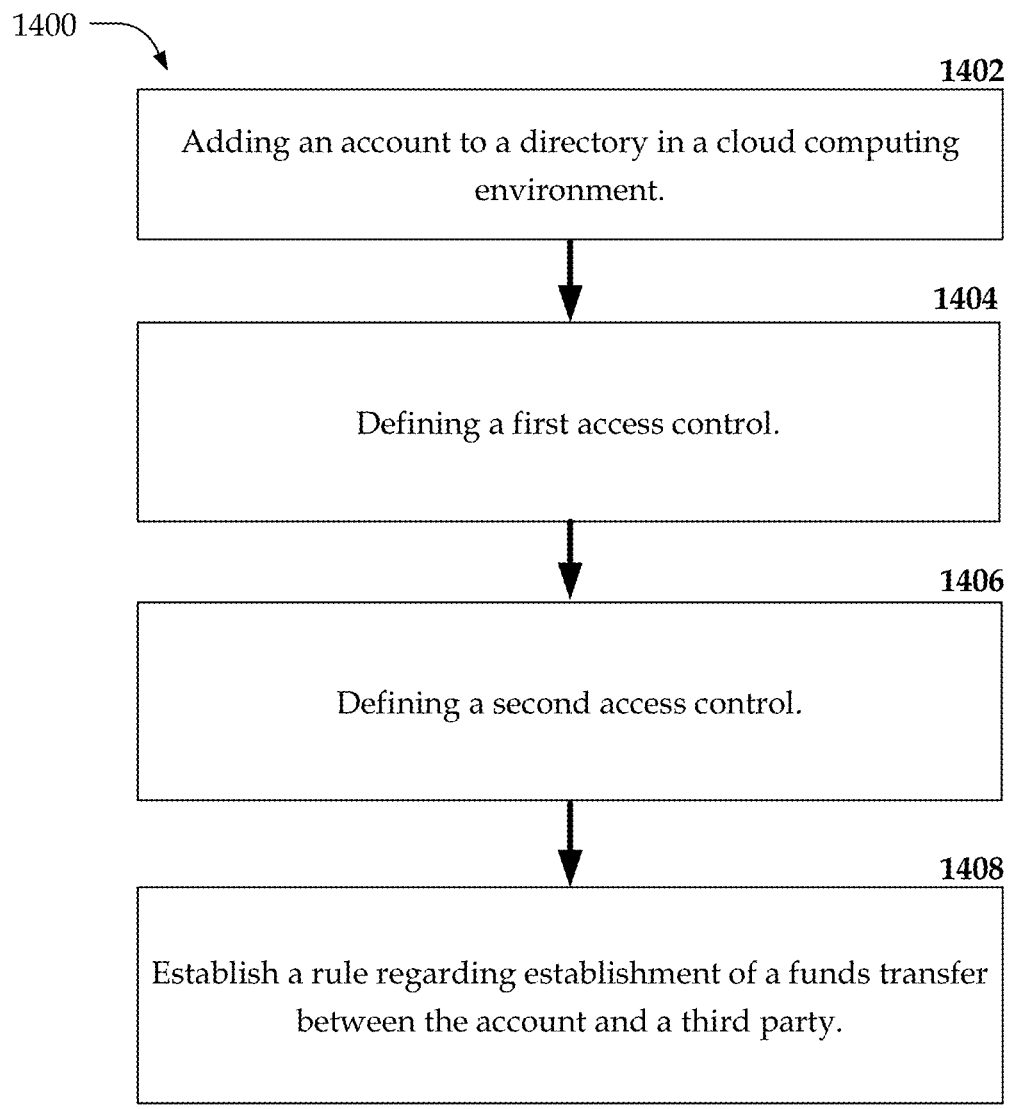
FIG. 14 a schematic process flow diagram of a method for defining an account in a data store in a cloud computing environment.
Figure 15:
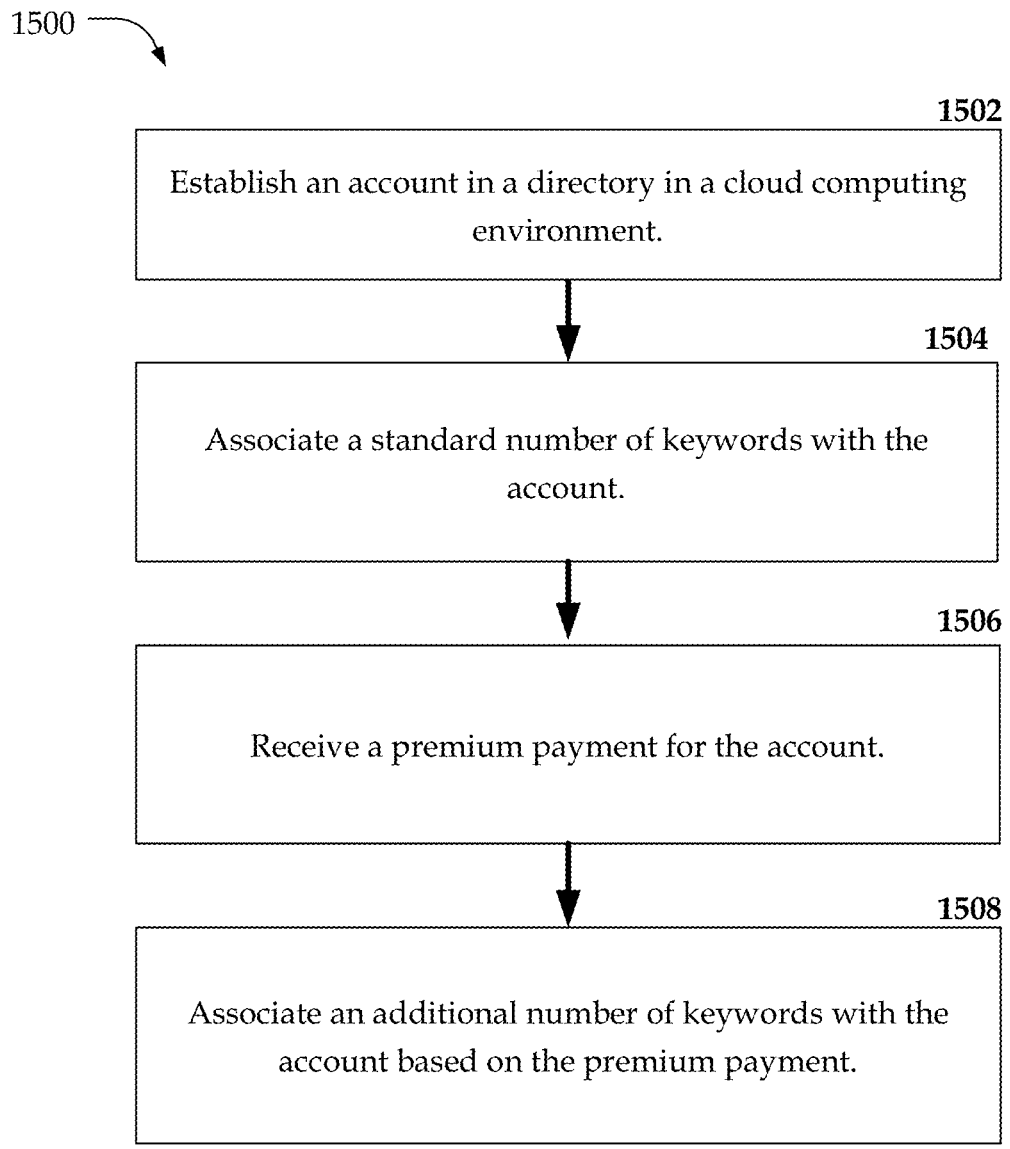
FIG. 15 a schematic process flow diagram of a method for establishing premium payment features for an account in a data store in a cloud computing environment.

FIGS. 14-15 illustrate methods that facilitate establishment of transactions between an entity and a third party. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a computer readable storage medium) to facilitate transporting and transferring such methodologies to computers. The term article of manufacture, as used herein, is intended to encompass a computer program accessible from any computer-readable device, carrier, or media, including a non-transitory computer readable storage medium. Any reference to a data store below can refer to a data store stored in a cloud computing environment. Additionally, all or part of the acts and/or steps described below can occur as a service in a cloud computing environment.

Referring now to FIG. 14, illustrated is a schematic process flow diagram of a method 1400 for defining an account in a data store in a cloud computing environment. The method begins at element 1402 where an account is added to a data store. The account can identification information and information related to one or more bank accounts. The identification information can include a name, a nickname, an e-mail address, an address, directions to the address, keywords, advertisements, incentives, and the like. The account can include a first bank account information related to a first bank account of a first type and a second bank account information related to a second bank account of a second type.

The entity can be a private entity, such as Joe Smith, or a public entity, such as Joe's Taxi Company. The entity can have multiple accounts associated with multiple functionalities. In the case of a private entity, Joe Smith can utilize his account in the data store to pay bills and to receive payments for sales through an auction site. He can establish different bank accounts to correspond to the different functionalities. In the case of the legal entity, Joe's Taxi Company can have different accounts associated with different functionalities, such as an account for payments from customers on the east side of the city and another account for payments from customers on the west side of the city.

At element 1404, a first access control can be defined for the account, and at element 1406, a second access control can be defined for the account. The first access control and the second access control can establish privacy considerations for the account. privacy parameters for the entity. The bank accounts are always kept private and never displayed to any user other than the entity itself. The privacy parameters can restrict the amount of identifying information that is displayed to third parties searching for the entity. The privacy parameters can establish that the entity never shows up as a result of a search, that the entity shows up only as a result of certain searches conducted by certain third parties, or that the entity shows up as a result of every search that it satisfies. The privacy parameters can establish that only a nickname is returned as a result of a search for a business transaction, while the entire identifying information is returned in a search for a personal transaction. For example, Joe Smith can set a privacy policy so a nickname only shows up in a search result for establishing a payment for an online auction, but his entire contact information shows up in a search result for establishing a payment for his electric bill.

At element 1408, a rule can be established regarding the establishment of a transaction, such as an electronic funds transfer, between a third party and the entity. The rule can, for example, require a verification before any linkage is established between the entity and a third party. The rule can also set conditions for which a verification is not required or conditions for which an electronic funds transfer is never established.

Referring now to FIG. 15, illustrated is a schematic process flow diagram of a method 1500 for establishing premium payment features for an account in a data store in a cloud computing environment. The method 1500 begins at element 1502 when an account is established in a data store. At element 1504, a standard number of keywords are associated with the account. For example, a standard number of keywords can be five keywords associated with the account. At element 1506, a premium payment is received for the account, and at element 1508 a corresponding additional number of keywords can be associated with the account. For example, the additional number of keywords can be three additional keywords. The additional keywords, or other premium features, can increase the likelihood that the entity with show up as a result of a search of the data store. Another example of a premium feature could be a text size or a graphic that would increase the visibility of the entity as a search result. A further example of a premium feature can be a reward and/or incentive that can be displayed with the entity as a result of a search of the data store.

Figure 16:
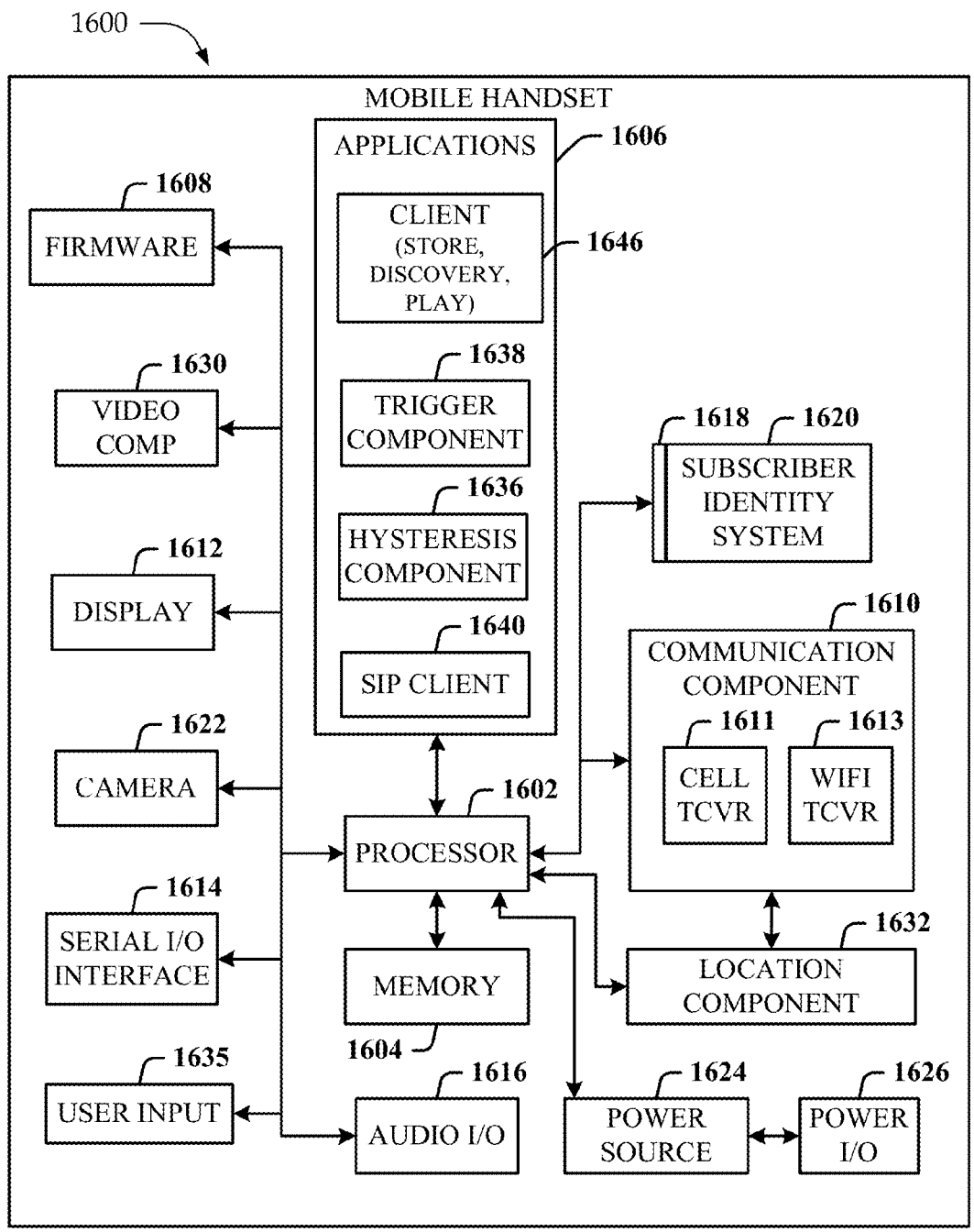
FIG. 16 illustrates a schematic diagram of an example mobile device (e.g., a mobile handset) that can facilitate the funds management services in accordance with the embodiments described herein.

Referring now to FIG. 16, illustrated is a schematic block diagram of an exemplary mobile device 1600 capable of generating, editing and sharing video clips in accordance with some embodiments described herein. Although a mobile handset 1600 is illustrated herein, it will be understood that other devices can be a mobile device, and that the mobile handset 1600 is merely illustrated to provide context for the embodiments of the innovation described herein. The following discussion is intended to provide a brief, general description of an example of a suitable environment 1600 in which the various embodiments can be implemented. While the description includes a general context of computer-executable instructions embodied on a computer readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multi-processor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1600 includes a processor 1602 for controlling and processing all onboard operations and functions. A memory 1604 interfaces to the processor 1602 for storage of data and one or more applications 1606 (e.g., a video player software, user feedback component software, etc.). Other applications can include voice recognition of predetermined voice commands that facilitate initiation of the user feedback signals. The applications 1606 can be stored in the memory 1604 and/or in a firmware 1608, and executed by the processor 1602 from either or both the memory 1604 or/and the firmware 1608. The firmware 1608 can also store startup code for execution in initializing the handset 1600. A communications component 1610 interfaces to the processor 1602 to facilitate wired/wireless communication with external systems, e.g., cellular networks, VoIP networks, and so on. Here, the communications component 1610 can also include a suitable cellular transceiver 1611 (e.g., a GSM transceiver) and/or an unlicensed transceiver 1613 (e.g., WiFi, WiMax) for corresponding signal communications. The handset 1600 can be a device such as a cellular telephone, a PDA with mobile communications capabilities, and messaging-centric devices. The communications component 1610 also facilitates communications reception from terrestrial radio networks (e.g., broadcast), digital satellite radio networks, and Internet-based radio services networks.

The handset 1600 includes a display 1612 for displaying text, images, video, telephony functions (e.g., a Caller ID function), setup functions, and for user input. For example, the display 1612 can also be referred to as a "screen" that can accommodate the presentation of multimedia content (e.g., music metadata, messages, wallpaper, graphics, etc.). The display 1612 can also display videos and can facilitate the generation, editing and sharing of video quotes. A serial I/O interface 1614 is provided in communication with the processor 1602 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1600, for example. Audio capabilities are provided with an audio I/O component 1616, which can include a speaker for the output of audio signals related to, for example, indication that the user pressed the proper key or key combination to initiate the user feedback signal. The audio I/O component 1616 also facilitates the input of audio signals through a microphone to record data and/or telephony voice data, and for inputting voice signals for telephone conversations.

The handset 1600 can include a slot interface 1618 for accommodating a SIC (Subscriber Identity Component) in the form factor of a card Subscriber Identity Module (SIM) or universal SIM 1620, and interfacing the SIM card 1620 with the processor 1602. However, it is to be appreciated that the SIM card 1620 can be manufactured into the handset 1600, and updated by downloading data and software.

The handset 1600 can process IP data traffic through the communication component 1610 to accommodate IP traffic from an IP network such as, for example, the Internet, a corporate intranet, a home network, a person area network, etc., through an ISP or broadband cable provider. Thus, VoIP traffic can be utilized by the handset 1600 and IP-based multimedia content can be received in either an encoded or decoded format.

A video processing component 1622 (e.g., a camera) can be provided for decoding encoded multimedia content. The video processing component 1622 can aid in facilitating the generation, editing and sharing of video quotes. The handset 1600 also includes a power source 1624 in the form of batteries and/or an AC power subsystem, which power source 1624 can interface to an external power system or charging equipment (not shown) by a power I/O component 1626.

The handset 1600 can also include a video component 1630 for processing video content received and, for recording and transmitting video content. For example, the video component 1630 can facilitate the generation, editing and sharing of video quotes. A location tracking component 1632 facilitates geographically locating the handset 1600. As described hereinabove, this can occur when the user initiates the feedback signal automatically or manually. A user input component 1634 facilitates the user initiating the quality feedback signal. The user input component 1634 can also facilitate the generation, editing and sharing of video quotes. The user input component 1634 can include such conventional input device technologies such as a keypad, keyboard, mouse, stylus pen, and/or touch screen, for example.

Referring again to the applications 1606, a hysteresis component 1636 facilitates the analysis and processing of hysteresis data, which is utilized to determine when to associate with the access point. A software trigger component 1638 can be provided that facilitates triggering of the hysteresis component 1638 when the WiFi transceiver 1613 detects the beacon of the access point. A SIP client 1640 enables the handset 1600 to support SIP protocols and register the subscriber with the SIP registrar server. The applications 1606 can also include a client 1642 that provides at least the capability of discovery, play and store of multimedia content, for example, music.

The handset 1600, as indicated above related to the communications component 1610, includes an indoor network radio transceiver 1613 (e.g., WiFi transceiver). This function supports the indoor radio link, such as IEEE 802.11, for the dual-mode GSM handset 1600. The handset 1600 can accommodate at least satellite radio services through a handset that can combine wireless voice and digital radio chipsets into a single handheld device.

Figure 17:
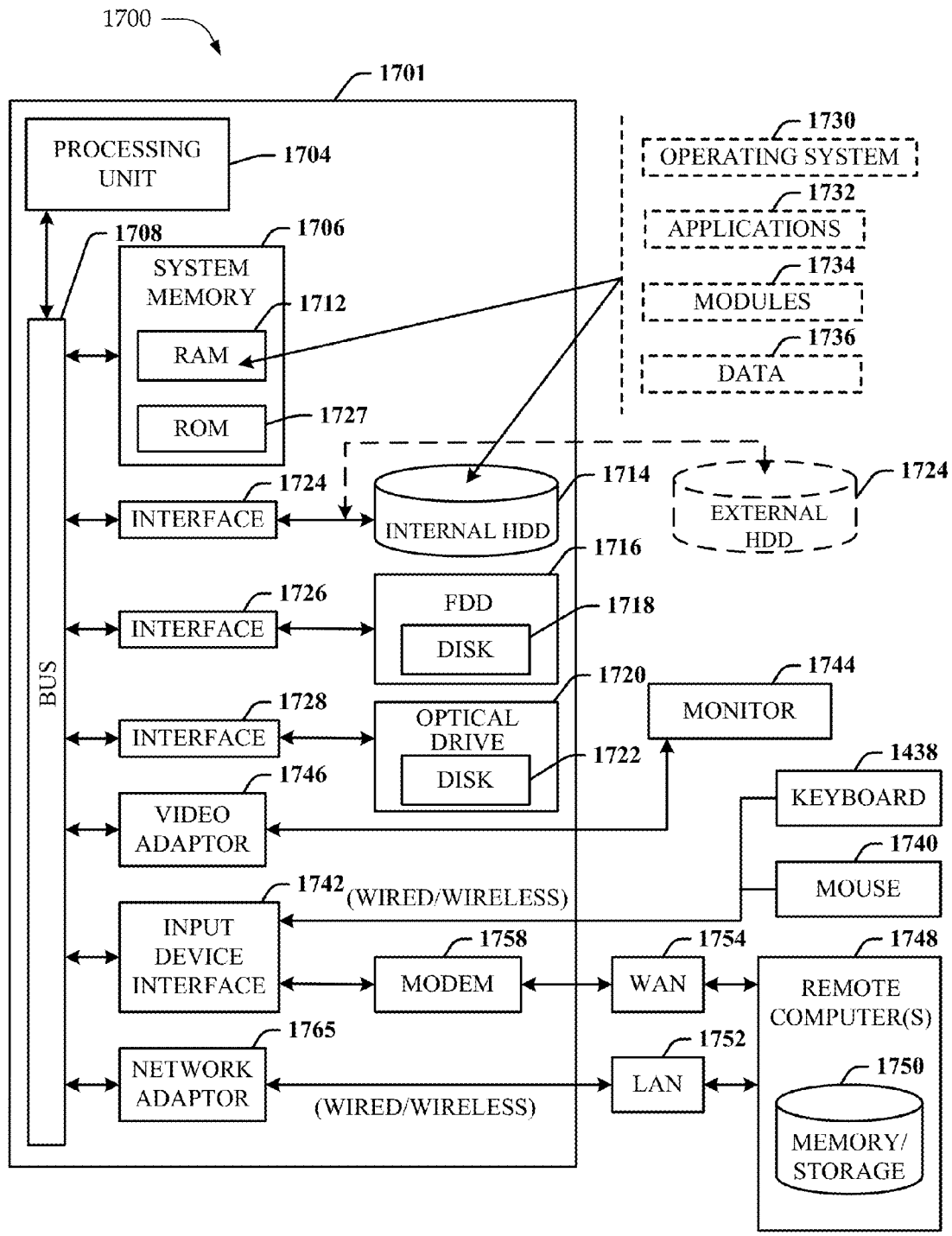
FIG. 17 illustrates a block diagram of an example computer operable to execute a system architecture that facilitates the establishment of transactions between an entity and a third party according to the embodiments described herein.

Referring now to FIG. 17, there is illustrated a block diagram of a computer operable to execute a system architecture that facilitates establishing a transaction between an entity and a third party. The computer can provide networking and communication capabilities between a wired or wireless communication network and a server and/or communication device. In order to provide additional context for various aspects thereof, FIG. 17 and the following discussion are intended to provide a brief, general description of a suitable computing environment 1700 in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the exemplary environment 1700 for implementing various aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors. Dual microprocessors and other multi processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes read-only memory (ROM) 1710 and random access memory (RAM) 1712. A basic input/output system (BIOS) is stored in a non-volatile memory 1710 such as ROM, EPROM, EEPROM, which BIOS contains the basic routines that help to transfer information between elements within the computer 1702, such as during start-up. The RAM 1712 can also include a high-speed RAM such as static RAM for caching data.

The computer 1702 further includes an internal hard disk drive (HDD) 1714 (e.g., EIDE, SATA), which internal hard disk drive 1714 can also be configured for external use in a suitable chassis (not shown), a magnetic floppy disk drive (FDD) 1716, (e.g., to read from or write to a removable diskette 1718) and an optical disk drive 1720, (e.g., reading a CD-ROM disk 1722 or, to read from or write to other high capacity optical media such as the DVD). The hard disk drive 1714, magnetic disk drive 1716 and optical disk drive 1711 can be connected to the system bus 1708 by a hard disk drive interface 1724, a magnetic disk drive interface 1726 and an optical drive interface 1728, respectively. The interface 1724 for external drive implementations includes at least one or both of Universal Serial Bus (USB) and IEEE 1794 interface technologies. Other external drive connection technologies are within contemplation of the subject innovation.

The drives and their associated computer-readable media provide nonvolatile storage of data, data structures, computer-executable instructions, and so forth. For the computer 1702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. It is to be appreciated that the innovation can be implemented with various commercially available operating systems or combinations of operating systems.

A user can enter commands and information into the computer 1702 through one or more wired/wireless input devices, e.g., a keyboard 1738 and a pointing device, such as a mouse 1740. Other input devices (not shown) may include a microphone, an IR remote control, a joystick, a game pad, a stylus pen, touch screen, or the like. These and other input devices are often connected to the processing unit 1704 through an input device interface 1742 that is coupled to the system bus 1708, but can be connected by other interfaces, such as a parallel port, an IEEE 2394 serial port, a game port, a USB port, an IR interface, etc.

A monitor 1744 or other type of display device is also connected to the system bus 1708 through an interface, such as a video adapter 1746. In addition to the monitor 1744, a computer typically includes other peripheral output devices (not shown), such as speakers, printers, etc.

The computer 1702 can operate in a networked environment using logical connections by wired and/or wireless communications to one or more remote computers, such as a remote computer(s) 1748. The remote computer(s) 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wired/wireless connectivity to a local area network (LAN) 1752 and/or larger networks, e.g., a wide area network (WAN) 1754. Such LAN and WAN networking environments are commonplace in offices and companies, and facilitate enterprise-wide computer networks, such as intranets, all of which may connect to a global communications network, e.g., the Internet.

When used in a LAN networking environment, the computer 1702 is connected to the local network 1752 through a wired and/or wireless communication network interface or adapter 1756. The adapter 1756 may facilitate wired or wireless communication to the LAN 1752, which may also include a wireless access point disposed thereon for communicating with the wireless adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wired or wireless device, is connected to the system bus 1708 through the serial port interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out; anywhere within the range of a base station. WiFi networks use radio technologies called IEEE 802.11(a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
adding, by a system comprising a processor, an account, comprising banking information and identification information, and at least two associated keywords to a data store located in a network environment;

defining, by the system, a first access control establishing a first subset of the identification information that is returned upon a search of the data store by a third party according to at least one of the at least two associated keywords;

defining, by the system, second access control establishing a second subset of the identification information that is visible after verification of the third party; and establishing, by the system, a rule regarding establishment of a funds transfer between the account and the third party.

2. The method of claim 1, further comprising receiving, by the system, a premium fee and associating the account with an additional number of keywords.

3. A system, comprising:
a memory that stores computer executable components, including:
an account establishment component configured to create an account in a data store and link the account with a plurality of keywords, wherein the account comprises identification information that identifies an entity associated with the account, first bank account information related to a first bank account of a first type associated with the account and second bank account information related to a second bank account of a second type associated with the account;
an access control component configured to establish a subset of the identification information visible upon a search of the data store by a third party according to at least one of the plurality of keywords; and
a linkage component configured to link the first bank account or the second bank account to the third party based on a match of a type of the third party to the first type or to the second type; and
a processor that executes at least one of the computer-executable components.

4. The system of claim 3, further comprising a verification component configured to receive approval from the entity before the entity is linked with the third party.

5. The system of claim 3, further comprising a payment component configured to receive a premium payment and to associate an additional plurality of keywords with the account associated with the entity.

6. The system of claim 3, further comprising a reward component configured to generate a reward for the third party in connection with choosing the entity from results of the search.

7. The system of claim 3, further comprising an encryption component configured to encrypt the first bank account information and the second bank account information.

8. A non-transitory computer readable storage medium having stored thereon computer executable instructions that, in response to execution, cause a computing system to perform operations, comprising:
creating an account associated with an entity in a data store, comprising identification information, first bank account information related to a first bank account of a first type and second bank account information related to a second bank account of a second type;
associating the account associated with the entity with a plurality of keywords;
establishing a subset of the identification information visible for a search of the data store by a third party according to at least one of the plurality of keywords;
linking the first bank account or the second bank account to the third party based on matching a type of the third party to the first type or the second type; and
issuing a reward to the third party in connection with the linking.

9. The method of claim 1, wherein the network environment is a cloud computing environment.

10. The method of claim 1, wherein the identification information comprises a name, an e-mail address, an address or directions to the address.

11. The method of claim 1, wherein the identification information comprises the at least two associated keywords.

12. The method of claim 1, wherein the identification information comprises an advertisement graphic or an incentive.

13. The method of claim 1, wherein the rule requires a verification before a linkage is established between the entity and a third party.

14. The method of claim 1, wherein the rule sets conditions for which a verification is not required.

15. The method of claim 1, wherein the rule sets conditions for which a linkage is never established.

16. The system of claim 3, further comprising a payment component configured to receive a premium payment and to associate a premium display feature related to a search result with the account associated with the entity.

17. The system of claim 16, wherein the premium display feature comprises a graphic or a large text size compared to a standard text size.

18. The system of claim 7, wherein the encryption component is further configured to mask the first bank account information and the second bank account information.

19. The system of claim 18, wherein the encryption component is configured to mask the first bank account information with a first fake bank account number and the second bank account information with a second bank account number.

20. The system of claim 3, further comprising an artificial intelligence component configured to employ an artificial intelligence technology to determine whether to allow the link.

21. The system of claim 20, wherein the artificial intelligence technique comprises a historical data analysis, a neural network, a classifier, or a support vector machine.

22. The system of claim 20, wherein the artificial intelligence component is further configured to determine whether to allow the link based on an access control parameter established by the access control component.

23. The non-transitory computer-readable storage medium of claim 8, wherein the operations further comprise:
receiving a premium payment; and
associating a premium feature with the account.

24. The non-transitory computer-readable storage medium of claim 23, wherein the premium feature comprises association of an additional plurality of keywords with the account.

25. The non-transitory computer-readable storage medium of claim 23, wherein the premium feature comprises a premium display feature.

26. The non-transitory computer-readable storage medium of claim 25, wherein the premium display feature comprises a graphic or a large text size compared to a standard text size.

27. The non-transitory computer-readable storage medium of claim 8, wherein the reward comprises a coupon or an incentive.

28. The non-transitory computer-readable storage medium of claim 8, wherein a plurality of rewards is associated with the entity.

29. The non-transitory computer-readable storage medium of claim 28, wherein the operations further comprise:
receiving a premium payment; and associating a greater number of rewards with the entity compared to the plurality of rewards.

* * * * *